US012192724B2

(12) United States Patent
Chang et al.

(10) Patent No.: US 12,192,724 B2
(45) Date of Patent: Jan. 7, 2025

(54) HEAD-MOUNTED DEVICE

(71) Applicant: HTC Corporation, Taoyuan (TW)

(72) Inventors: Li-Hsun Chang, Taoyuan (TW); Chih-Hsiang Hsieh, Taoyuan (TW)

(73) Assignee: HTC Corporation, Taoyuan (TW)

( * ) Notice: Subject to any disclaimer, the term of this patent is extended or adjusted under 35 U.S.C. 154(b) by 208 days.

(21) Appl. No.: 18/073,570

(22) Filed: Dec. 2, 2022

(65) Prior Publication Data

US 2024/0187792 A1 Jun. 6, 2024

(51) Int. Cl.
*H04R 7/18* (2006.01)
*H04R 1/10* (2006.01)

(52) U.S. Cl.
CPC ............. *H04R 7/18* (2013.01); *H04R 1/1041* (2013.01); *H04R 2307/207* (2013.01)

(58) Field of Classification Search
CPC .. H04R 7/18; H04R 1/1041; H04R 2307/207; H04R 2201/025; H04R 5/0335
See application file for complete search history.

(56) References Cited

U.S. PATENT DOCUMENTS 11,366,325 B2 * 6/2022 Silfvast ................ G02B 27/017

FOREIGN PATENT DOCUMENTS

| | | |
|---|---|---|
| CN | 107534806 | 1/2018 |
| CN | 108429971 | 10/2019 |
| CN | 110475174 | 11/2019 |
| CN | 112654913 | 4/2021 |
| CN | 112291686 | 4/2022 |
| JP | 2004254289 | 9/2004 |
| TW | 202117395 | 5/2021 |

OTHER PUBLICATIONS

Di Censo et al. DE 11 2015 006 758 T5. "Self-Adjusting Headed Audio Device" with Translation. (Year: 2105).*

"Office Action of Taiwan Counterpart Application", issued on Nov. 8, 2023, p. 1-p. 5.

"Office Action of Taiwan Counterpart Application", issued on Apr. 25, 2024, p. 1-p. 7.

* cited by examiner

*Primary Examiner* — Brian Ensey
(74) *Attorney, Agent, or Firm* — JCIPRNET

(57) ABSTRACT

A head-mounted device includes a host, a first cradle, a second cradle, a speaker, and a shape memory alloy element. The first cradle and the second cradle are connected to two opposite sides of the host. The speaker is movably disposed on the first cradle. The shape memory alloy element is connected between the speaker and the first cradle and is configured to move the speaker after being powered on and heated and shrinking.

6 Claims, 5 Drawing Sheets

HEAD-MOUNTED DEVICE

BACKGROUND

Technical Field

The invention relates to a head-mounted device, and in particular, relates to a head-mounted device with a movable speaker.

Description of Related Art

At present, with the rapid advancement of technology, the types and functions of head-mounted devices are increasingly diversified. Taking a head-mounted device of the eye mask type as an example, when a user wears this type of device, the gyroscope and position tracker inside the head-mounted device will track the user's movement status to project corresponding scene images, providing the user with an experience as if he/she is in a virtual world.

Regarding the use of a head-mounted device, in addition to the improvement on the visual experience, the sound effect is also one of the key elements to enhance the user's sense of immersion. However, in the head-mounted devices currently available in the market, if earphones are used to enhance the sound and light experience, the size of the earphone unit is usually excessively large. If the embedded design is used in the head cradle, it is easy to cause poor fitting and poor comfort due to the different head shapes of users. If the plug-in design is used, it is easy to cause inconvenience in adjusting the position of the earphone unit, and the wearing experience is thus affected.

SUMMARY

The invention provides a head-mounted device with a movable speaker so as to provide a favorable wearing experience and favorable sound quality.

The invention provides a head-mounted device including a host, a first cradle, a second cradle, a speaker, and a shape memory alloy element (SMA element). The first cradle and the second cradle are connected to two opposite sides of the host. The speaker is movably disposed on the first cradle. The SMA element is connected between the speaker and the first cradle and is configured to move the speaker after being powered on and heated and shrinking.

To sum up, in the head-mounted device provided by the invention, the position of the speaker can be adjusted by using the SMA element, so as to prevent the user's ear from colliding with the speaker when wearing the head-mounted device. Therefore, the convenience of the wearing process can be improved. Besides, since the position of the speaker can be adjusted to match the position of the ears of different users, the user can thereby obtain favorable sound quality.

DESCRIPTION OF THE EMBODIMENTS

Figure 1:
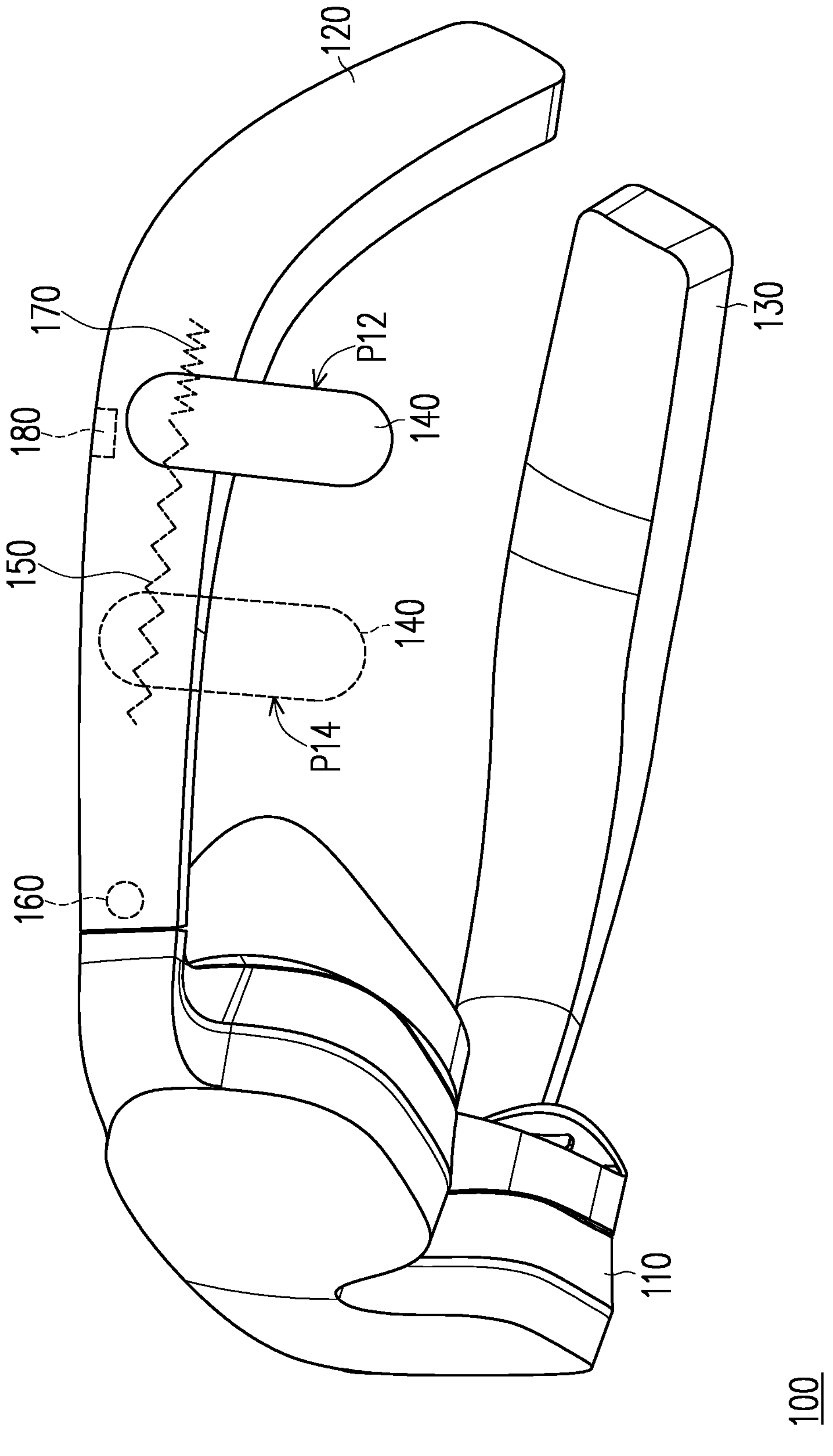
FIG. 1 is a schematic view of a head-mounted device according to an embodiment of the invention.

FIG. 1 is a schematic view of a head-mounted device according to an embodiment of the invention. With reference to FIG. 1, a head-mounted device 100 in this embodiment includes a host 110, a first cradle 120, a second cradle 130, a speaker 140, and a SMA element 150. The first cradle 120 and the second cradle 130 are connected to two opposite sides of the host 110. The first cradle 120 and the second cradle 130 are, for example, suitable to be worn on both ears of a user, so as to support the host 110 in front of the user's eyes. The speaker 140 is movably disposed on the first cradle 120. The SMA element 150 is connected between the speaker 140 and the first cradle 120 and is configured to move the speaker 140 after the SMA element 150 is powered on and heated and then shrinks.

Figure 3:
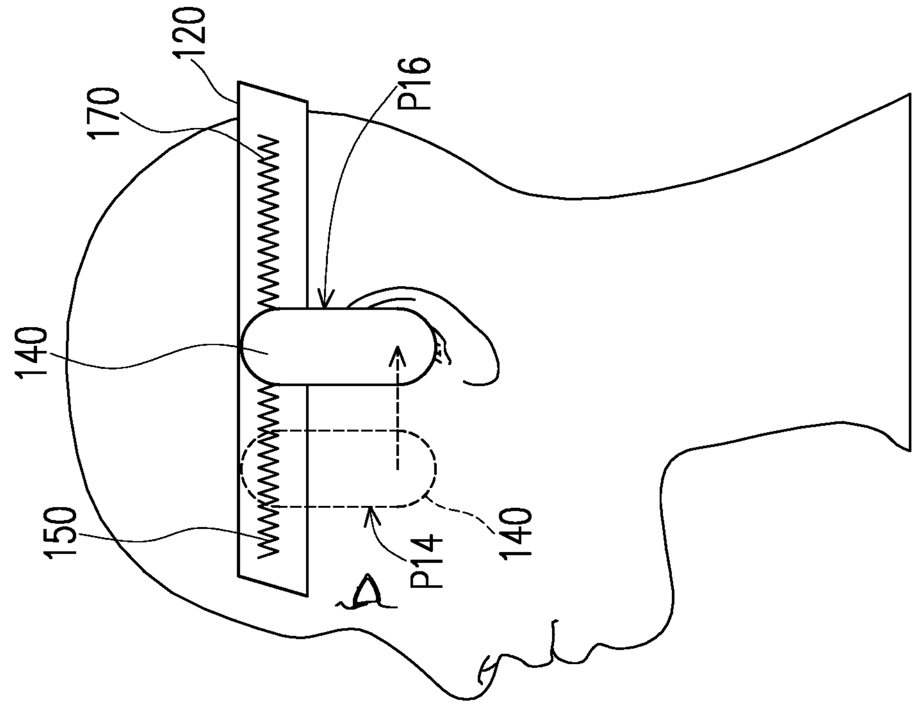
FIG. 2 and FIG. 3 are schematic views of a moving process of a speaker of the head-mounted device of FIG. 1.
Figure 2:
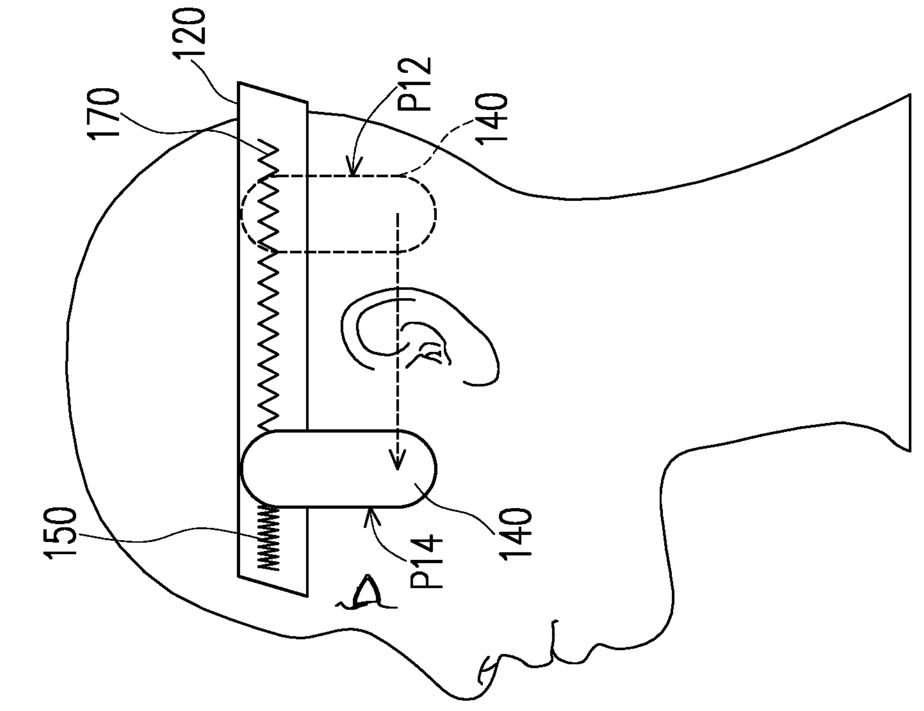

FIG. 2 and FIG. 3 are schematic views of a moving process of a speaker of the head-mounted device of FIG. 1. With reference to FIG. 1, when the SMA element 150 is in a power-off state, the speaker 140 is located at an original position P12. With reference to FIG. 2, after the SMA element 150 is powered on and heated and then shrinks, the SMA element 150 may drive the speaker 140 to move from the original position P12 to a wearing position P14 as shown in FIG. 2. The wearing position P14 is, for example, a position away from the user's ear. Therefore, when the user puts on the head-mounted device 100 on the head, the speaker 140 may be kept in front of the user's ear without blocking the user's ear.

With reference to FIG. 3, after the user puts on the head-mounted device 100, the SMA element 150 may be in the power-off state again. At this moment, a length of the SMA element 150 may elongate as the temperature decreases, and the speaker 140 may move away from the wearing position P14 and gradually approach the user's ear. When the speaker 140 reaches a final position P16 against the user's ear, the user's ear may prevent the speaker 140 from moving further.

The speaker 140 against the user's ear can transmit the sound to the user's ear well, so there is no need to use a high-power speaker 140. Further, the speaker 140 may naturally be blocked by the user's ear against the user's ear. Therefore, even if the position of each user's ear is different, the speaker 140 can automatically stop at a suitable position and provide favorable sound quality.

With reference to FIG. 1, the head-mounted device 100 in this embodiment may further include a switch 180 disposed on the first cradle 120 and configured to allow the SMA element 150 to be powered on and heated after the user turns on the switch 180. For instance, when the user wants to wear the head-mounted device 100, the user may turn on the switch 180 so that the SMA element 150 begins to shrink. The switch 180 may be a mechanical switch or a touch switch, which is not limited in the invention. Further, the switch 180 may also be disposed on the host 110, the second cradle 130, or other appropriate positions. With proper design, when the user wants to wear the head-mounted device 100 and picks up the head-mounted device 100, the user naturally touches the switch 180 and powers on and heats the SMA element 150, so that the speaker 140 is automatically moved to the wearing position P14. In this way, an intuitive and convenient user experience is provided.

The head-mounted device provided by this embodiment may further include a sensor 160 assembled to the host 110 or the first cradle 120 and configured to sense the degree of rotation of the first cradle 120 relative to the host 110 and accordingly power on and heat the SMA element 150. For instance, when the user wants to wear the head-mounted device 100, the user may open the first cradle 120 and the second cradle 130 relative to the host 110. When the sensor 160 senses that the degree of rotation of the first cradle 120 relative to the host 110 is greater than a predetermined value, the sensor 160 powers on and heats the SMA element 150 to make it shrink. Therefore, when the user wants to wear the head-mounted device 100 and rotates the first cradle 120, the sensor 160 may naturally power on and heat the SMA element 150, and the speaker 140 may then be automatically moved to the wearing position P14. In this way, an intuitive and convenient user experience is provided.

In this embodiment, the head-mounted device 100 may further include a reset element 170 connected between the speaker 140 and the first cradle 120 and configured to keep the speaker 140 at an original position P12 when the SMA element 150 is in the power-off state. For instance, in FIG. 1, the SMA element 150 is in the power-off state, and the elastic restoring force of the reset element 170 keeps the speaker 140 at the original position P12. In FIG. 3, the SMA element 150 turns from a power-on state to the power-off state, and the reset element 170 pulls the speaker 140 to move from the wearing position P14 to the final position P16. The reset element 170 may also use a SMA, but the invention is not limited thereto.

In this embodiment, the SMA element 150 is configured to translate the speaker 140. In addition, although one speaker 140 is used as an example in this embodiment, a plurality of speakers 140 may be provided in other embodiments. Further, the speaker 140 may also be disposed on the second cradle 130. In this embodiment, the host 110 is a head-mounted display and may be applied in fields such as virtual reality systems, augmented reality systems, or mixed reality systems, for example. The host 110 may include an optical system and elements such as a protective housing and may be provided with a display or may be suitable for allowing a display to be placed. The aforementioned display may be a built-in display or an external portable display (e.g., a smart phone, etc.), but the invention is not limited thereto. The optical system includes optical elements for changing the optical path of the display, such as lenses, light guides, or prisms. The host 110 in FIG. 1 is presented in a slightly larger form, but the host 110 may also be of a lighter form or other forms.

Figure 4:
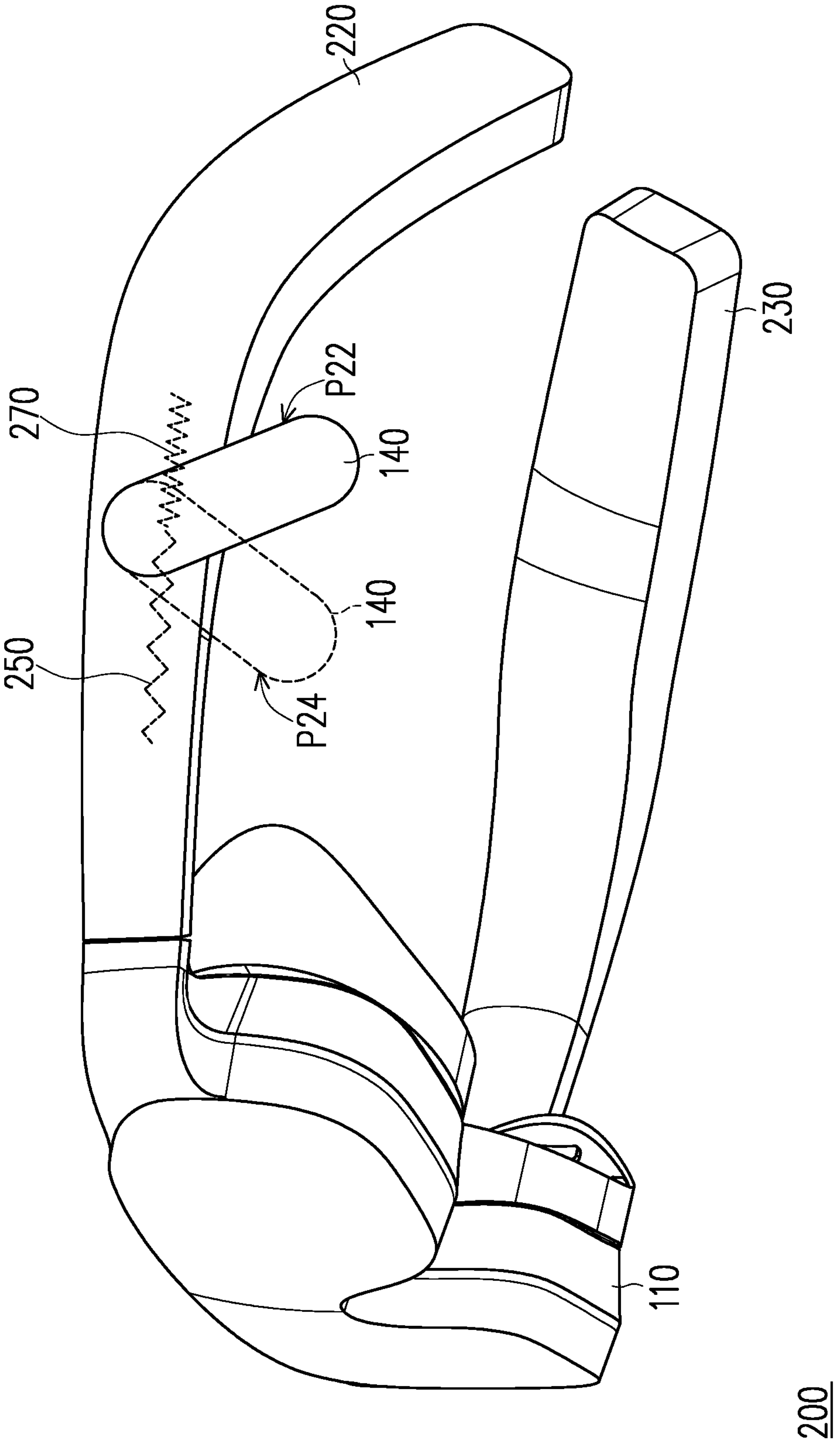
FIG. 4 is a schematic view of a head-mounted device according to another embodiment of the invention.
Figure 6:
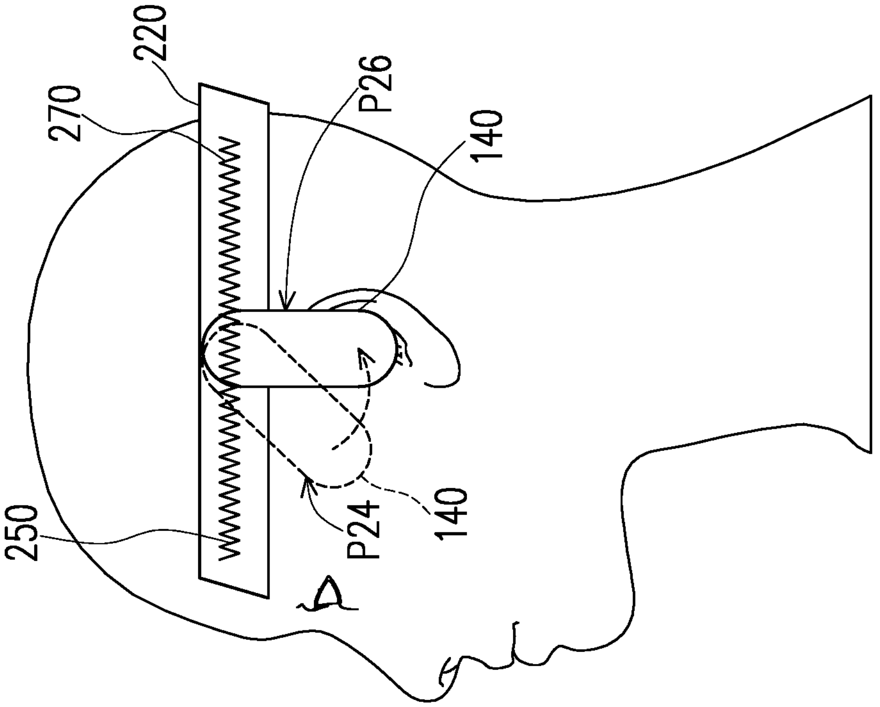
FIG. 5 and FIG. 6 are schematic views of a moving process of a speaker of the head-mounted device of FIG. 4.
Figure 5:
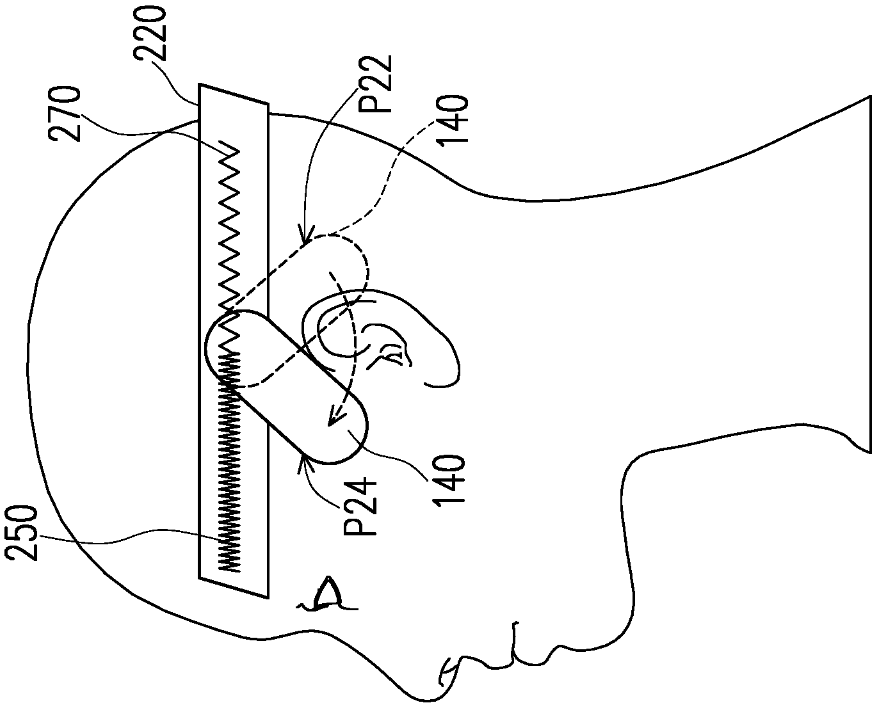

FIG. 4 is a schematic view of a head-mounted device according to another embodiment of the invention. FIG. 5 and FIG. 6 are schematic views of a moving process of a speaker of the head-mounted device of FIG. 4. With reference to FIG. 5, a head-mounted device 200 of this embodiment is similar to the head-mounted device 100 of FIG. 1, and only the differences between the two are described herein. In this embodiment, a SMA element 250 of the head-mounted device 200 is configured to rotate the speaker 140. For instance, the speaker 140 is rotatably assembled to a first cradle 220 but may also be assembled to a second cradle 230. With reference to FIG. 4, when the SMA element 250 is in the power-off state, the speaker 140 is located at an original position P22. With reference to FIG. 5, after the SMA element 250 is powered on and heated and then shrinks, the SMA element 250 may drive the speaker 140 to move from the original position P22 to a wearing position P24 as shown in FIG. 5. The wearing position P24 is, for example, a position away from the user's ear. Therefore, when the user puts on the head-mounted device 200 on the head, the speaker 140 may be kept in front of the user's ear without blocking the user's ear.

With reference to FIG. 6, after the user puts on the head-mounted device 200, the SMA element 250 may be in the power-off state again. At this moment, a length of the SMA element 250 may elongate as the temperature decreases, and the speaker 140 may move away from the wearing position P24 and gradually approach the user's ear. When the speaker 140 reaches a final position P26 against the user's ear, the user's ear may prevent the speaker 140 from moving further. In this embodiment, the head-mounted device 100 may further include a reset element 270 connected between the speaker 140 and the first cradle 220 and configured to drive the speaker 140 to rotate and keep the speaker 140 at the original position P22. The reset element 270 is, for example, a telescopic spring.

Figure 7:
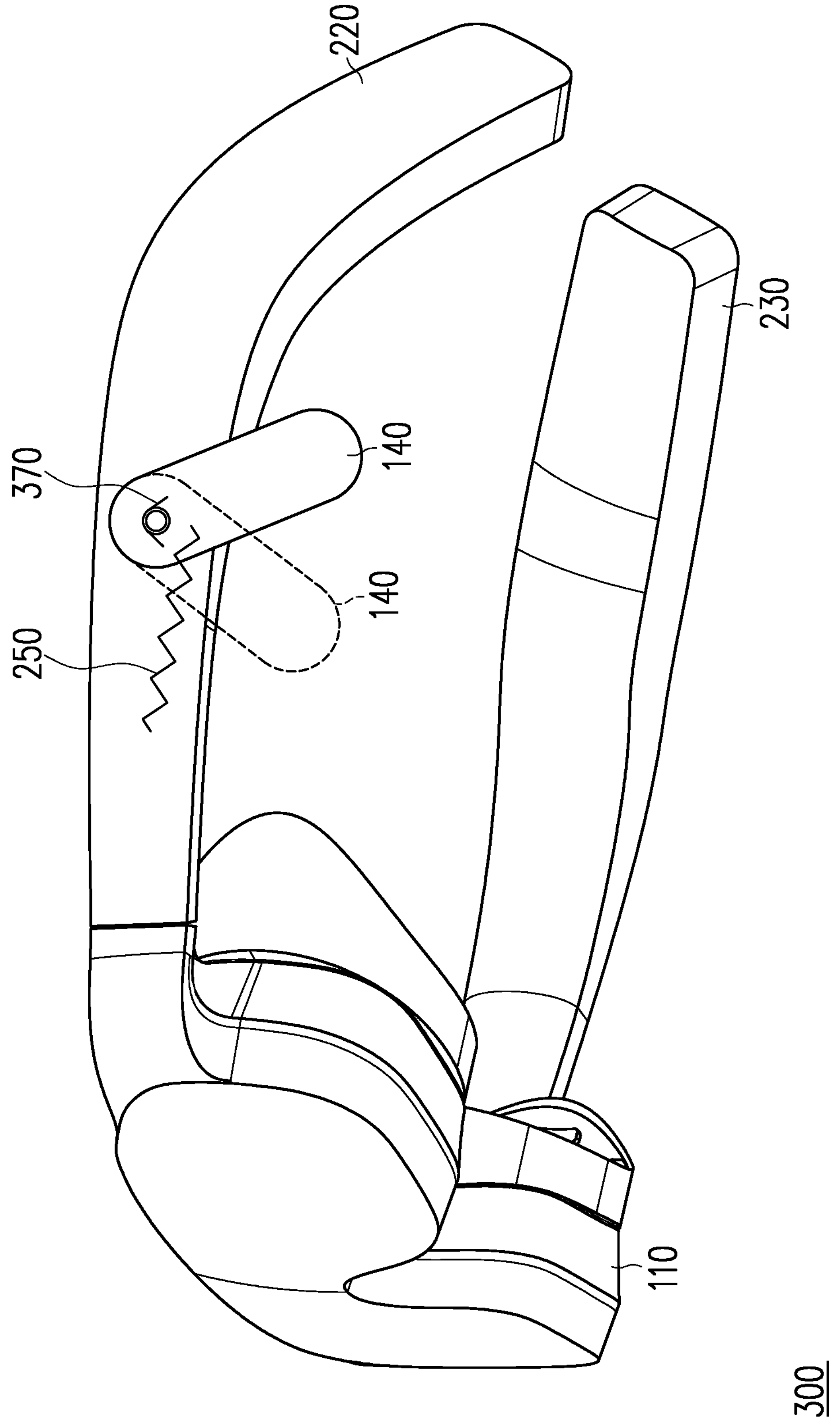
FIG. 7 is a schematic view of a head-mounted device according to still another embodiment of the invention.

FIG. 7 is a schematic view of a head-mounted device according to still another embodiment of the invention. With reference to FIG. 7, a head-mounted device 300 of this embodiment is similar to the head-mounted device 200 of FIG. 4, and only the differences between the two are described herein. In this embodiment, the reset element 370 is, for example, a torsion spring, which can also drive the speaker 140 to rotate and keep the speaker 140 at the original position.

In view of the foregoing, when the user is wearing the head-mounted device provided by the invention, the SMA element can drive the speaker to move to a position that may not affect the wearing process, and after the wearing is completed, the speaker can naturally be placed against the user's ear to deliver favorable sound quality. The convenience of wearing and the favorable sound quality are provided. In other words, even if the position of each user's ear is different, the speaker can automatically stop at a suitable position and provide favorable sound quality.

What is claimed is:

1. A head-mounted device, comprising:
- a host;
- a first cradle and a second cradle connected to two opposite sides of the host;
- a speaker movably disposed on the first cradle;
- a shape memory alloy element connected between the speaker and the first cradle and configured to move the speaker after being powered on and heated and shrinking; and
- a reset element connected between the speaker and the first cradle and configured to keep the speaker at an original position when the shape memory alloy element is in a power-off state.

2. The head-mounted device according to claim 1, further comprising a sensor assembled to the host or the first cradle and configured to sense the degree of rotation of the first cradle relative to the host and accordingly power on and heat the shape memory alloy element.

3. The head-mounted device according to claim 1, wherein the shape memory alloy element is configured to translate the speaker.

4. The head-mounted device according to claim 1, wherein the shape memory alloy element is configured to rotate the speaker.

5. The head-mounted device according to claim 1, wherein the host is a head-mounted display.

6. The head-mounted device according to claim 1, further comprising a switch disposed on the first cradle and configured to allow the shape memory alloy element to be powered on and heated after a user turns on the switch.

* * * * *